June 12, 1928.
L. A. MAPEL
DEVICE FOR DISPENSING LIQUIDS
Filed July 25, 1924
1,672,983
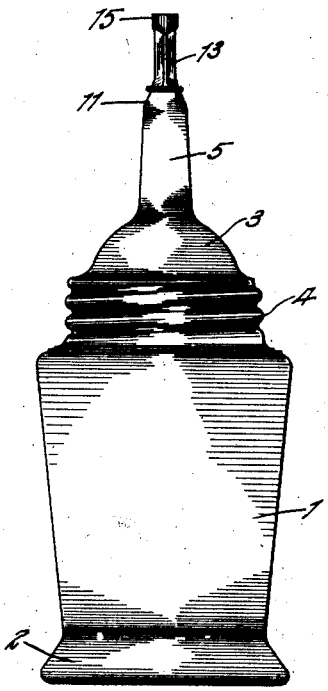
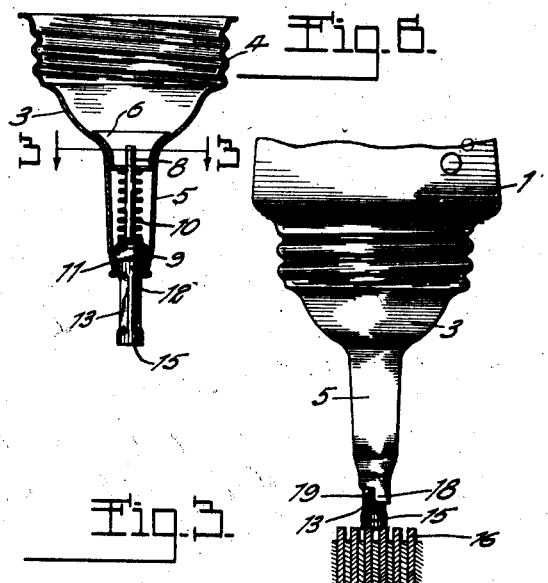

Patented June 12, 1928.

1,672,983

UNITED STATES PATENT OFFICE.

LEWIS A. MAPEL, OF ST. LOUIS, MISSOURI, ASSIGNOR TO AUTOMATIC APPLIANCE COMPANY, OF ST. LOUIS, MISSOURI, A CORPORATION OF MISSOURI.

DEVICE FOR DISPENSING LIQUIDS.

Application filed July 25, 1924. Serial No. 728,138.

This invention relates to a device for dispensing liquid to a receptacle, and more particularly to a device for dispensing liquid to a storage battery cell such as used in motor cars, radio and the like.

The proper care of a storage battery requires that it occasionally be filled with pure water to a predetermined level. During the operation of the battery some of this water evaporates, so that replenishment of the same must be attended to quite frequently. The ordinary storage battery is equipped with a narrow mouth through which filling may be carried out, this mouth being usually just large enough to receive a plug for partially sealing the cell. Such a plug is ordinarily provided with a vent-hole for the escape of gases, but closes the cell sufficiently to prevent splashing of the liquid therefrom. Filling the battery through such a small opening, usually less than one inch in diameter, is a tedious operation, and it is difficult to tell when the cell has been filled to the proper level.

One of the objects of this invention, therefore, is to provide means for dispensing water or other liquid to a battery or similar receptacle having a small opening which will not only be convenient for operation, but which will fill the battery to a given level and avoid over-filling.

Another object of this invention is to provide such a device having dispensing means provided with a suitable valve for controlling the operation thereof.

Another object is to provide such a device which may conveniently be handled with one hand in carrying out the entire filling operation.

Another object is to provide such a device which will indicate visually the operation thereof.

Further objects will appear from the detail description taken in connection with the accompanying drawing, in which:

Figure 1 is a view in elevation of a dispensing device embodying this invention;

Figure 2 is a sectional view of the screw top showing the valve in the spout;

Figure 3 is a section on line 3—3, Figure 2;

Figure 4 is a sectional view showing the device in use and illustrating the method of visual indication;

Figure 5 is a view similar to Figure 4 showing the receptacle filled to its predetermined level and the filling operation arrested; and Figure 6 is a view of the dispensing spout showing the means for starting the flow of liquid.

Referring to the accompanying drawing, 1 designates a container which is preferably constructed of glass so as to be transparent, but which may be constructed or other suitable material, such, for instance, as hard rubber or the like. The container 1 may be provided at its bottom with an outwardly flared rim 2. This rim serves not only to provide an extended bottom so as to render the container more stable when standing on its bottom, but also provides a hand-hold or rim which may be gripped by the fingers when the container is in use, as illustrated in Figures 4 and 5. This rim obviates the possibility of the container slipping from the fingers when turned up-side down. The container 1 is provided with a wide mouth at its upper end equipped with screw threads, preferably the same as those ordinarily provided at the mouth of a standard Mason jar. This threaded mouth has mounted thereon a dispensing top 3 provided with threads 4 adapted to fit those on the container and a spout 5 narrow enough to pass easily into the filling opening of the ordinary battery. The top 3 may be constructed of hard rubber, metal or other suitable material, but should be of such material as is not readily attacked by the acids used in the battery.

Fixed within the base of the spout 5 is a plug or bracket 6. This may be formed of pressed metal or other suitable material and may be pressed into or otherwise fixed in the spout 5. This bracket is provided with a series of openings 7 through which the liquid and air may pass and a central opening adapted to receive and guide the stem 8 of a valve 9. The stem 8 is surrounded by a spring 10 bearing against the valve 9 and the bracket 6 which serves as an abutment therefor, said spring serving to maintain the valve seated in the conical end 11 of the spout 5. This is the normal position of the valve 9 in which the container is sealed against the escape of liquid. The valve 9 is provided with an outwardly directed cylindrical extension 12 which is just large enough to fill the opening in the end of the spout 5 but is provided with a series, in the case illustrated three, of cutaway portions or recesses 13 extending along the shank and providing a clearance between the extension 12 and the end of the spout 5 for the escape of liquid from the container or the admission of air to the container.

In the use of this device the container is grasped by the bottom so that the fingers may close over the rim 2. The container is then inverted and the spout 5 inserted in the plug hole of the battery receptacle 14 as illustrated in Figure 4. The end 15 of the extension 12, which should be of insulating material, provides an abutment adapted to engage the tops of the battery plates 16 as illustrated in Figure 4 so that downward pressure upon the container will collapse the spring 10 so as to force the valve 9 upwardly into a larger portion of the spout 5, which has a generally conical shape throughout its length, so as to open the spout for the flow of liquid therefrom. Naturally the flow of liquid from the container is accompanied by a flow of air into the container. The recesses 13 provide separate paths or channels for the liquid and the air so that there may be a continuous and uniform flow of each. Thus the liquid flows downwardly through certain of these channels while the air flows upwardly through others thereof into the container, passing to the top of the liquid in the container by a series of bubbles 17 which furnish a visual indication of the operation of the device. The length of the spring 10 is so adjusted that when the container is pressed down until all the coils of the spring rest against one another and further compression is arrested, the end of the spout 5 will stand at a predetermined distance above the end 15 of the extension 12. In the case of the ordinary storage battery, this distance is about one-half inch.

The distance of the end of the spout above the tops of the plates is thus fixed during the dispensing operation. When the level of the liquid in the receptacle rises to the end of the spout as determined, this liquid will seal the spout against the entrance of air and will, therefore, cut off further flow of liquid into the battery. It will be clear, therefore, that over-filling is impossible with this device. The cessation of bubbling in the container also provides an indication to the operator that the operation is complete and the device may be withdrawn. As the device is withdrawn the spring 10 returns the valve 9 to its seat, thereby sealing the container so as to avoid spilling or slopping of the liquid when the container is withdrawn.

In order to insure that the flow of liquid is started promptly, the device illustrated in Figure 6 may be employed. In this embodiment a part of the lip of the spout 5 is extended beyond the rest so as to provide on one side an extension 18 and on the other side a corresponding depression or notch 19. It will be seen that when this device is inverted and inserted in the receptacle, the extension 18, which covers one or more of the recesses 13 in the extension 12, provides a higher liquid column over the exit opening of the receptacle on that side than is provided on the side of the notch 19. In other words, the liquid columns in the several recesses 13 are unbalanced, one being heavier than the other. Consequently the liquid in the heavier column will promptly flow downwardly and thereby induce an upward flow of air through the channel or path opposite the notch 19.

It will be seen, therefore, that this invention accomplishes its objects. The container 1 is so formed as to be readily manipulated with one hand and at the same time the danger of allowing the same to slip from the fingers is obviated by the hand-hold provided by the rim 2. The top 3 being provided with the ordinary Mason jar screw 4 is adapted for use with any ordinary Mason jar or other standard container which is equipped with the standard Mason jar screw at the mouth. The valve 9 keeps the container normally sealed so that it may be held in any position and inverted at any time without spilling the liquid. Since it may be held in inverted position, it may be conveniently inserted in the plug hole of the battery and a simple downward pressure starts the flow of liquid. The unbalancing of the liquid columns as illustrated in Figure 6 assists in starting the flow. The provision of separate paths for liquid and air also insures a uniform and steady flow while the bubbles provide a visual indication of the operation and tell when the same is complete. An entire absence of bubbling will indicate that the cell is already filled to the proper level. Upon withdrawing the container, the simple lifting thereof will cause the valve to close and seal the same against spilling of the liquid.

It will thus be seen that a very convenient and rapid means for filling battery receptacles is provided by this invention. While the foregoing discussion has described this as a means for filling the cell with water, it will be understood that the standard electrolyte or other liquids may be handled not only in filling storage battery cells, but in filling other receptacles to a given depth, the device cooperating with the receptacle in determining that depth.

It is obvious that various changes may be made in details of construction without departing from the spirit of this invention;

it is, therefore, to be understood that this invention is not to be limited to the specific details shown and described.

Having thus described the invention, what is claimed is:

1. A device for dispensing liquid to a receptacle, comprising, a liquid container, a dispensing spout thereon, means movable in the end of said spout to provide separate paths of flow through said spout, a valve for said spout having a part adapted for cooperation with the receptacle to open said valve, and means for automatically closing said valve to seal said container.

2. A device for dispensing liquid to a receptacle, comprising, a liquid container, a dispensing spout thereon, closing means for said spout adapted to provide a path for downward flow of liquid and a separate path for upward flow of air therethrough, and a valve for said spout having a part cooperating with the receptacle to open said valve.

3. In a device of the character described, a dispensing element, comprising, a Mason-jar top, a dispensing spout thereon, means providing separate flow paths through said spout, and a valve for said spout adapted to close said paths.

4. In a device of the character described, a dispensing element, comprising, a Mason-jar top, a dispensing spout thereon, and means for opening and closing said spout adapted to provide separate flow paths of different lengths through said spout.

5. In a device of the character described, a dispensing element, comprising, a Mason-jar top, a dispensing spout thereon, and a valve for said spout having means thereon providing a liquid flow path and an air flow path through said spout.

6. In a device of the character described, a dispensing element, comprising a Mason-jar top, a dispensing spout thereon, means providing a liquid flow path and an air flow path through said spout, and a valve for said spout adapted to close said paths.

7. In a device of the character described, a dispensing element, comprising a Mason-jar top, a dispensing spout thereon, and a valve for said spout having means thereon providing a liquid flow path and an air flow path through said spout, said valve having a part thereon adapted for cooperation with a receptacle to operate said valve.

8. In a device of the character described, a liquid container, a dispensing spout thereon, means providing separate flow paths through said spout, a valve for said spout adapted to control said paths and having a part adapted for cooperation with the receptacle to open said valve, and means determining the height to which the receptacle is filled.

9. In a device of the character described, a liquid container, a dispensing spout thereon, means providing separate flow paths through said spout, a valve for said spout adapted to control said paths and having a part adapted for cooperation with the receptacle to open said valve, and means for positioning said spout in the receptacle.

10. In a device of the character described, a liquid container, a dispensing spout thereon, means providing separate flow paths through said spout, a valve for said spout adapted to control said paths and having a part adapted for cooperation with the receptacle to open said valve, and a stop adapted to limit the extent of insertion of said spout into the receptacle.

11. A device for dispensing liquid to a receptacle, comprising, a liquid container, a dispensing spout thereon, and a closure for said spout adapted upon retraction to open a plurality of paths of flow through said spout.

12. A device for dispensing liquid to a receptacle, comprising, a liquid container, a dispensing spout thereon, a closure for said spout adapted upon retraction to open a plurality of paths of flow through said spout, and a valve connected with said closure.

13. A device for dispensing liquid to a receptacle, comprising, a liquid container, a dispensing spout thereon, and a closure for said spout, having a fluted portion adapted upon retraction to open a plurality of paths of flow through said spout.

14. A device for dispensing liquid to a receptacle, comprising, a liquid container, a dispensing spout thereon, and a valve for said spout having a stem adapted upon retraction to open a plurality of paths of flow through said spout.

In testimony whereof I affix my signature this 8th day of July, 1924.

LEWIS A. MAPEL.